(12) United States Patent
Kim et al.

(10) Patent No.: US 12,432,698 B2
(45) Date of Patent: Sep. 30, 2025

(54) METHOD FOR ASSIGNING BEAM MANAGEMENT ID TO TERMINAL IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Youngdae Kim, Seoul (KR); Jungyong Park, Seoul (KR); Yeongjun Kim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 527 days.

(21) Appl. No.: 17/759,471

(22) PCT Filed: Feb. 18, 2020

(86) PCT No.: PCT/KR2020/002317
§ 371 (c)(1),
(2) Date: Feb. 22, 2023

(87) PCT Pub. No.: WO2021/167122
PCT Pub. Date: Aug. 26, 2021

(65) Prior Publication Data
US 2023/0180187 A1    Jun. 8, 2023

(51) Int. Cl.
*H04W 72/02* (2009.01)
*H04B 7/06* (2006.01)
(Continued)

(52) U.S. Cl.
CPC .......... *H04W 72/02* (2013.01); *H04W 16/28* (2013.01); *H04W 72/51* (2023.01)

(58) Field of Classification Search
CPC ..... H04W 72/02; H04W 72/40; H04W 72/51; H04W 16/28; H04W 76/14; H04W 92/18; H04W 4/40; H04B 7/06952
See application file for complete search history.

(56) References Cited

U.S. PATENT DOCUMENTS

| 8,795,168 B2 * | 8/2014 | Goh ....................... G16H 20/30 340/8.1 |
| 2010/0027489 A1 * | 2/2010 | Matsuzawa .......... H04W 16/12 370/329 |

(Continued)

FOREIGN PATENT DOCUMENTS

| KR | 10-2019-0070146 | 6/2019 |
| NO | 2019-036578 | 2/2019 |
| WO | 2019-009454 | 1/2019 |

OTHER PUBLICATIONS

PCT International Application No. PCT/KR2020/002317, International Search Report dated Nov. 3, 2020, 3 pages.
(Continued)

*Primary Examiner* — Jenee Holland
(74) *Attorney, Agent, or Firm* — LEE, HONG, DEGERMAN, KANG & WAIMEY

(57) ABSTRACT

Disclosed are the method for assigning a beam management ID based on a plurality of zones in which a user equipment (UE) is included in a pre-set region, and the apparatus therefor, the method comprising the steps of: transmitting, to a base station, an assignment request signal requesting assignment of a beam obtainment ID related to any one zone among the plurality of zones; and obtaining, from the base station, information about a first zone specified among the plurality of zones, on the basis of the assignment request signal, and information about a first beam obtainment ID for identifying a beam management signal in the first zone, wherein the first zone is one zone specified among the (Continued)

plurality of zones, on the basis of a moving direction of the UE.

15 Claims, 23 Drawing Sheets

(51) Int. Cl.
*H04W 4/40* (2018.01)
*H04W 16/28* (2009.01)
*H04W 72/40* (2023.01)
*H04W 72/51* (2023.01)
*H04W 76/14* (2018.01)
*H04W 92/18* (2009.01)

(56) References Cited

U.S. PATENT DOCUMENTS

| | | | |
|---|---|---|---|
| 2010/0067499 A1* | 3/2010 | Oota | H04L 5/0087 370/336 |
| 2010/0075687 A1* | 3/2010 | Chayat | H04W 72/046 455/450 |
| 2010/0172307 A1* | 7/2010 | Niki | H04W 16/06 370/329 |
| 2015/0358890 A1* | 12/2015 | Xu | H04W 48/04 455/437 |
| 2017/0090010 A1* | 3/2017 | Dackefjord | G01S 5/0249 |
| 2017/0373745 A1* | 12/2017 | Park | H04B 7/0478 |
| 2018/0206268 A1* | 7/2018 | Abdallah | H04W 74/02 |
| 2019/0335348 A1* | 10/2019 | Hou | H04W 4/06 |
| 2020/0045664 A1 | 2/2020 | Choi et al. | |
| 2021/0014831 A1* | 1/2021 | Ryu | H04W 72/02 |
| 2021/0099847 A1* | 4/2021 | Uchiyama | H04W 4/46 |

OTHER PUBLICATIONS

Huawei et al., "Beamforming for V2X sidelink for FR1 and FR2," R1-1900862, 3GPP TSG RAN WG1 Ad-Hoc Meeting 1901, Jan. 2019, 7 pages.

* cited by examiner

PU5-U (a)

(a)

(b)

METHOD FOR ASSIGNING BEAM MANAGEMENT ID TO TERMINAL IN WIRELESS COMMUNICATION SYSTEM SUPPORTING SIDELINK, AND APPARATUS THEREFOR

TECHNICAL FIELD

The present disclosure relates to a method and apparatus for assigning beam management identification (ID) based on a plurality of zones included in a preconfigured area to a user equipment (UE) in a wireless communication system supporting a sidelink.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X can be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method of assigning a beam acquisition ID based on each of a plurality of zones included in a preconfigured area to minimize an issue caused by half duplex between terminals while increasing resource utilization of the beam acquisition ID.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

In one aspect of the present disclosure, a method of assigning a beam management identification (ID) to a user equipment (UE) based on a plurality of zones included in a preconfigured area in a wireless communication system supporting a sidelink may include transmitting, to a base station, an assignment request signal for requesting assignment of a beam acquisition ID related to one of the plurality of zones, and acquiring, from the base station, information about a first zone specified based on the assignment request signal among the plurality of zones and information about a first beam acquisition ID for identification of a beam management signal in the first zone, wherein the first zone may be a zone specified based on a movement direction of the UE among the plurality of zones.

In one embodiment, the assignment request signal may include information about a location, movement speed and movement direction measured with respect to the UE.

In one embodiment, the method may further include performing a search for the beam management signal for neighboring UEs for a preset time, wherein the assignment request signal may be transmitted together with a signal for an initial access to the base station after the search is completed.

In one embodiment, the assignment request signal further may include information about the beam acquisition ID for the neighboring UEs.

In one embodiment, based on the movement direction being changed by a preset threshold angle or more or based on a movement speed greater than or equal to a preset threshold speed being detected for a preset threshold time, the UE may transmit a reassignment request for a request for an update of the first beam acquisition ID to the base station after the preset time.

In one embodiment, the reassignment request signal may include the first beam acquisition ID, beam acquisition IDs for neighboring UEs detected for the preset time, and beam acquisition IDs for other UEs connected by the beam management signal.

In one embodiment, the plurality of zones may be configured to be pre-divided in the preconfigured area based on a predetermined reference direction and a specific angle, wherein the first zone may include other UEs having a movement direction within a first angle.

In one embodiment, the first beam acquisition ID may be assigned from among remaining beam acquisition IDs excluding beam acquisition IDs for the other UEs from among a plurality of beam acquisition IDs included in a beam acquisition ID set preconfigured for the first zone.

In one embodiment, based on the assignment request signal being transmitted while further including information about the beam acquisition ID for neighboring UEs searched for a preset time, the first beam acquisition ID may be assigned from among remaining beam acquisition IDs excluding the beam acquisition IDs for the other UEs and beam acquisition IDs for the neighboring UEs in the beam acquisition ID set.

In one embodiment, the beam management signal may be transmitted only in a first transmission interval, the first transmission interval being one transmission interval among the plurality of transmission intervals.

In one embodiment, based on a plurality of beam acquisition IDs included in a beam acquisition ID set preconfigured for the first zone being all assigned, the first beam acquisition ID may be assigned to overlap with any one of beam acquisition IDs assigned to the other UEs based on a time when each of the plurality of beam acquisition IDs is assigned to the other UEs.

In one embodiment, the predetermined reference direction may be determined based on a geographical feature of the preconfigured area.

In one embodiment, the predetermined reference direction may be predetermined based on a latitude and longitude of the preconfigured area.

In one embodiment, the first beam acquisition ID may be independently assigned regardless of a beam acquisition ID assigned to each of the plurality of zones except for the first zone.

In another aspect of the present disclosure, a method of assigning a beam management identification (ID) based on a plurality of zones included in a preconfigured area by a base station in a wireless communication system supporting a sidelink may include receiving, from a user equipment (UE), an assignment request signal for requesting assignment of a beam acquisition ID related to one of the plurality of zones, specifying a first zone from among the plurality of zones based on the assignment request signal, assigning a first beam acquisition ID for identification of a beam management signal in the first zone, and transmitting information about the first zone and information about the first beam acquisition ID to the UE, wherein the first zone may be a zone specified based on a movement direction of the UE among the plurality of zones.

In another aspect of the present disclosure, a user equipment (UE) assigned a beam management identification (ID) based on a plurality of zones included in a preconfigured area in a wireless communication system supporting a sidelink may include a radio frequency (RF) transceiver, and a processor connected to the RF transceiver, wherein the processor may control the RF transceiver to transmit, to a base station, an assignment request signal for requesting assignment of a beam acquisition ID related to one of the plurality of zones, and to acquire, from the base station, information about a first zone specified based on the assignment request signal among the plurality of zones and information about a first beam acquisition ID for identification of a beam management signal in the first zone, wherein the first zone may be a zone specified based on a movement direction of the UE among the plurality of zones.

In another aspect of the present disclosure, a chipset assigned a beam management identification (ID) based on a plurality of zones included in a preconfigured area in a wireless communication system supporting a sidelink may include a memory storing a program related to assignment of the beam acquisition ID of a beam management signal, and a processor configured to generate a beam management signal based on the program stored in the memory, wherein the processor may acquire beam configuration information including information about a beam acquisition ID assigned to the UE from the memory, determine a first transmission interval among a plurality of transmission intervals in which the beam management signal is allowed to be transmitted within a preset period, and generate the beam management signal to be transmitted in the first transmission interval, wherein the first transmission interval may be determined based on the beam acquisition ID.

In one embodiment, the processor may control a driving mode of a device connected to the UE based on the first transmission interval.

Advantageous Effects

Various embodiments may assign a beam acquisition ID based on each of a plurality of zones included in a preconfigured area. Thereby, resource utilization of the beam acquisition ID may be increased and an issue caused by half duplex between terminals may be minimized.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
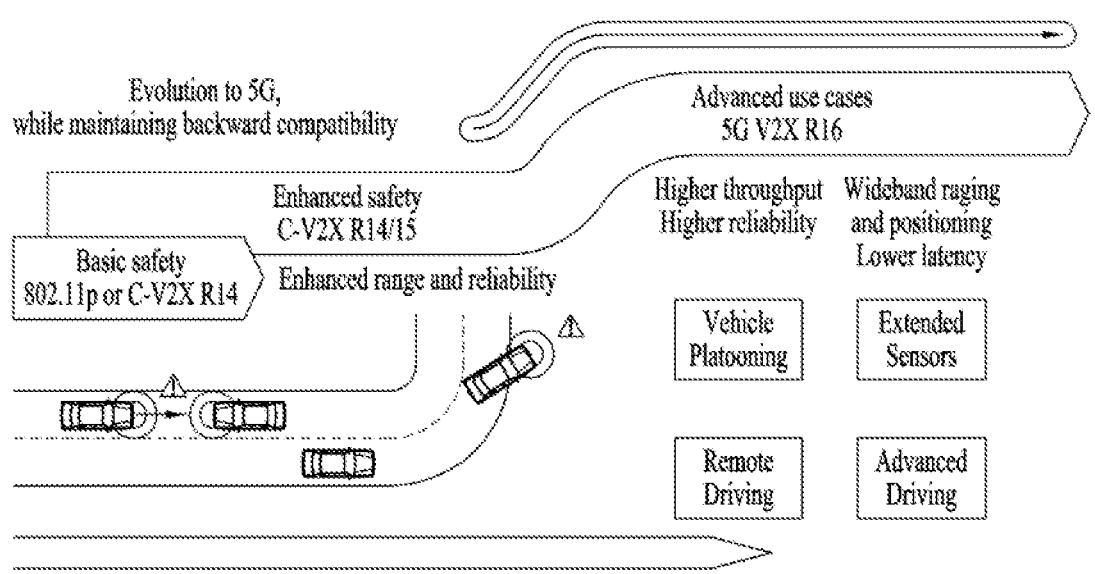
FIG. 1 is a diagram for explaining by comparing V2X communication based on RAT before NR and V2X communication based on NR

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

Figure 2:
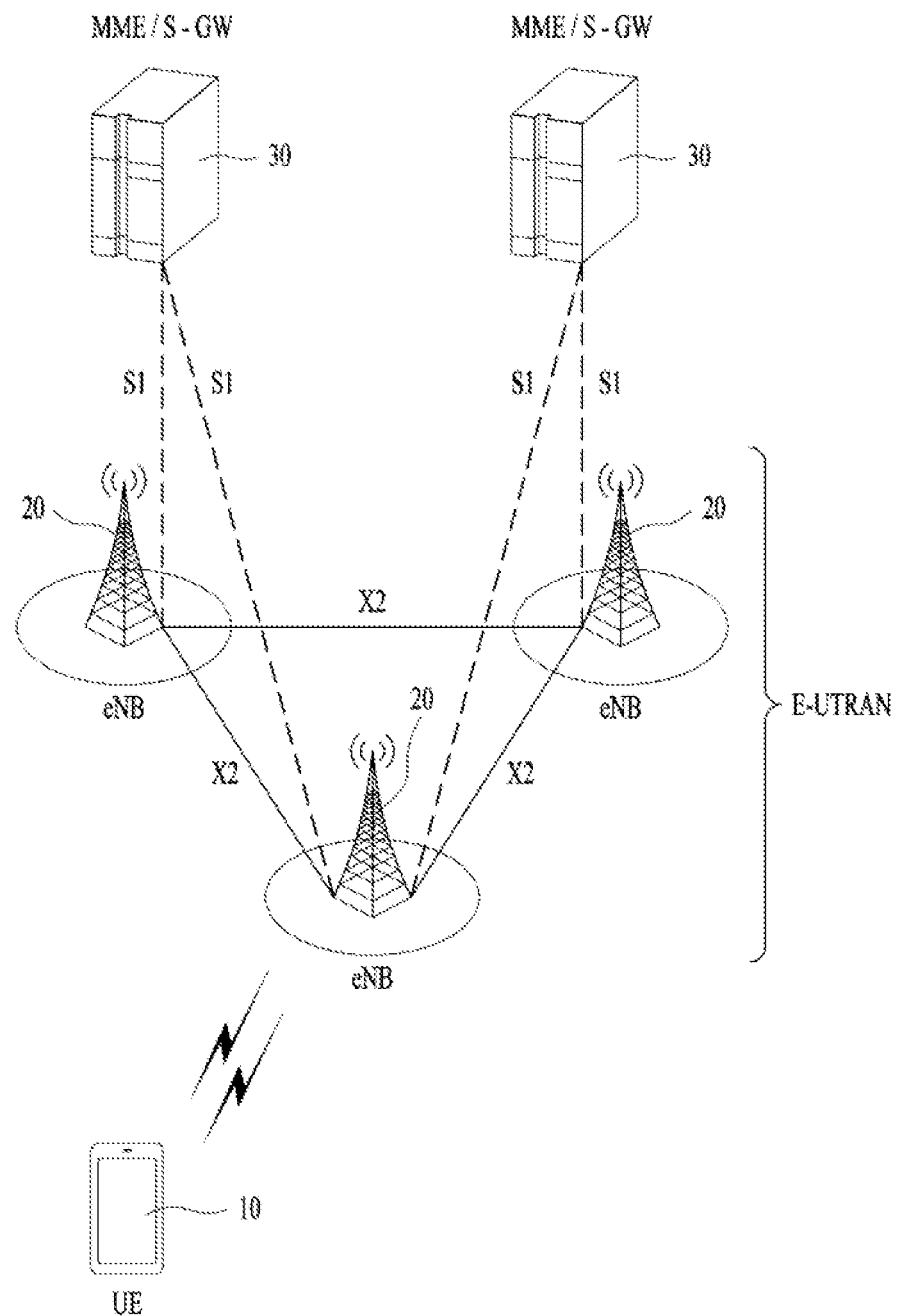
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
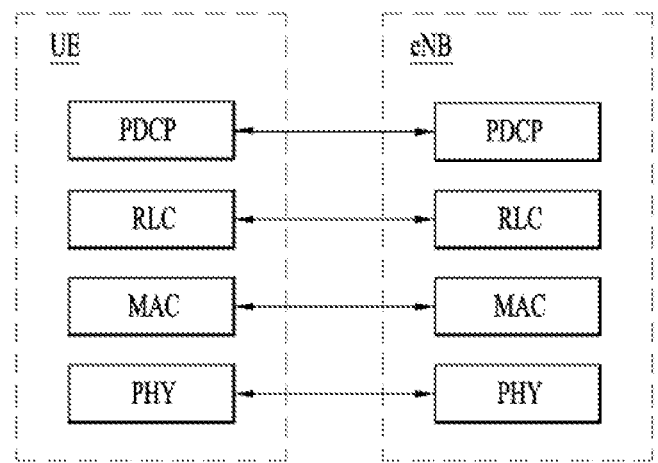
FIG. 3 illustrates a user-plane radio protocol architecture to which embodiment(s) are applicable.

FIG. 3 illustrates a user-plane radio protocol architecture to which the present disclosure is applicable.

Figure 4:
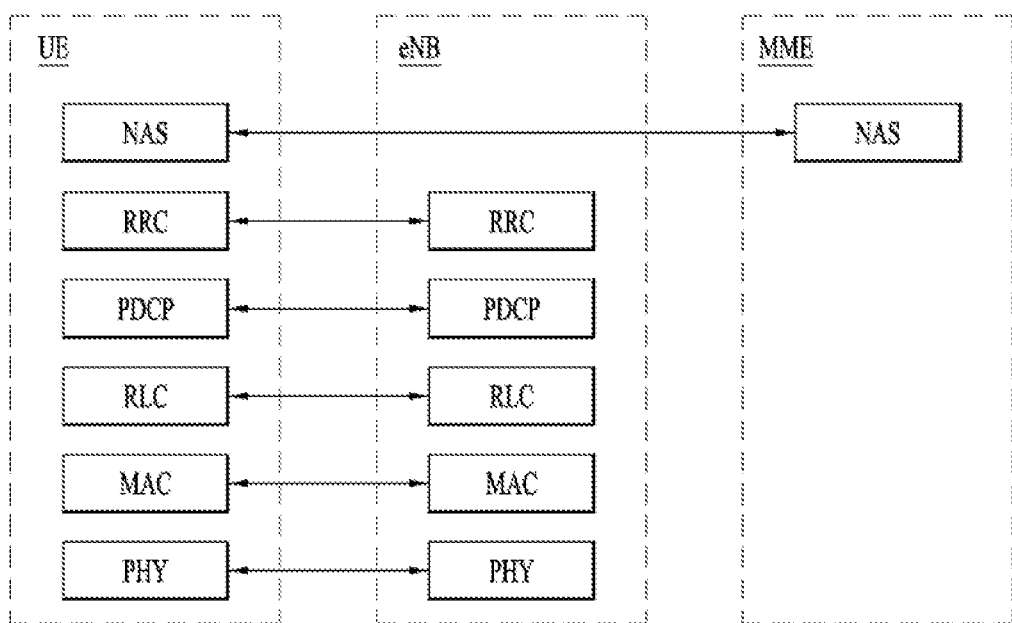
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
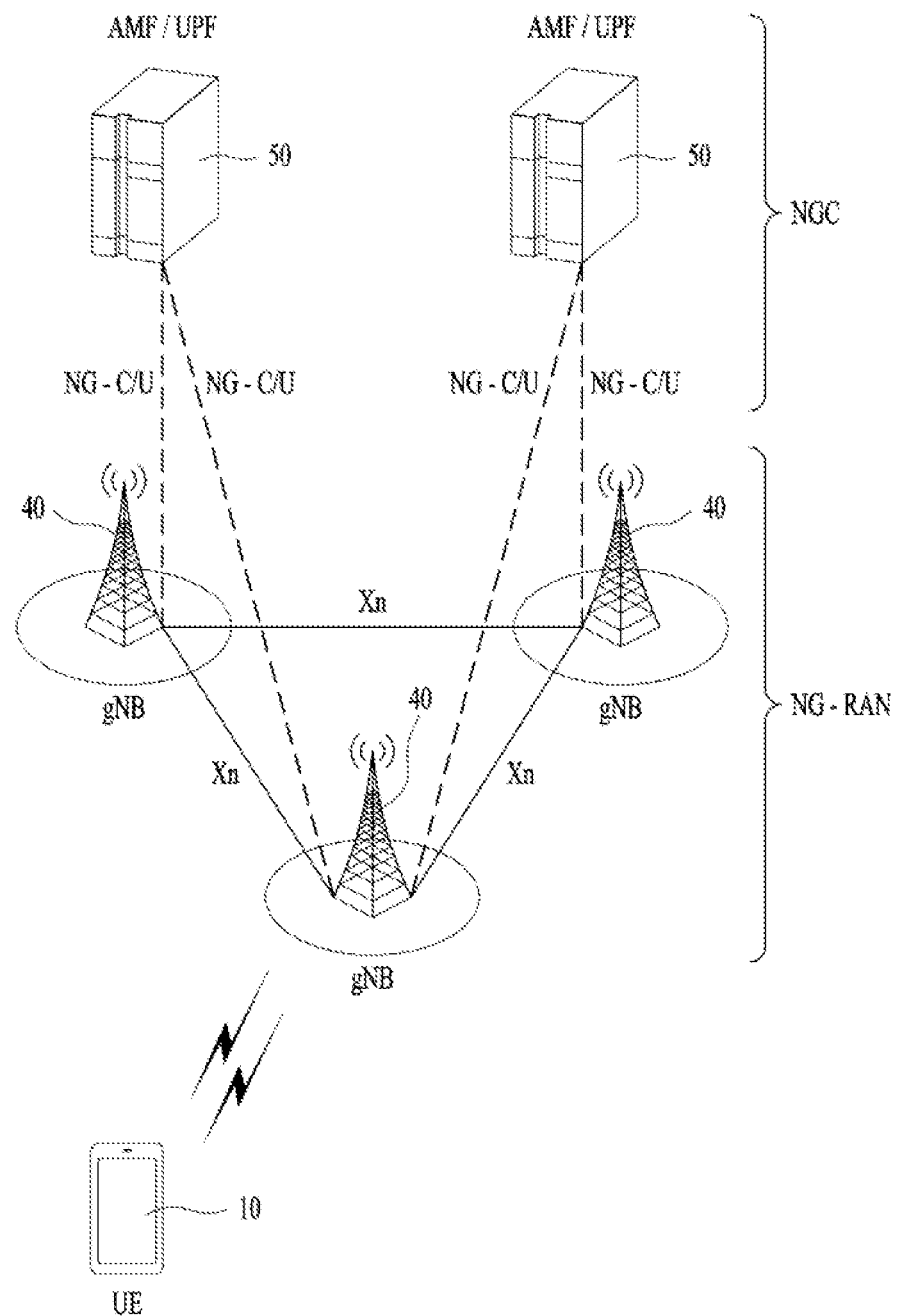
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
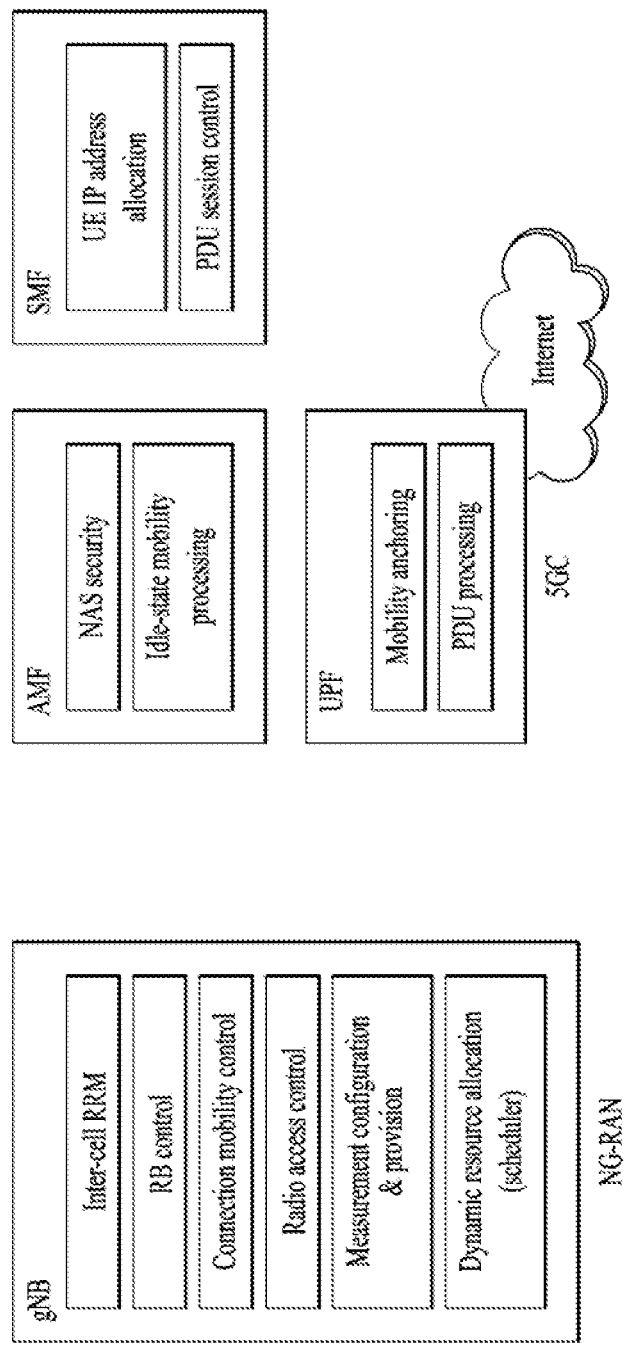
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
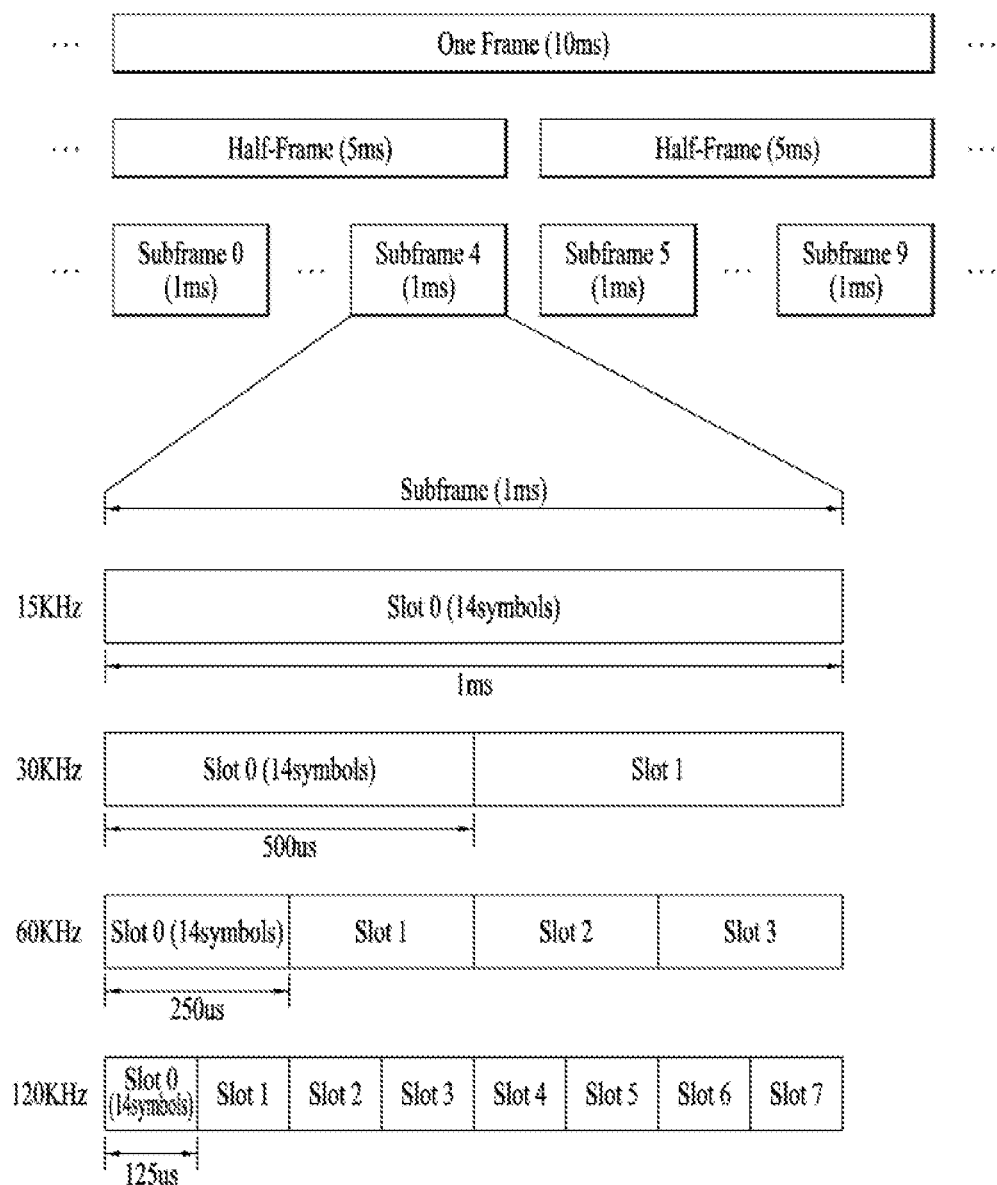
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
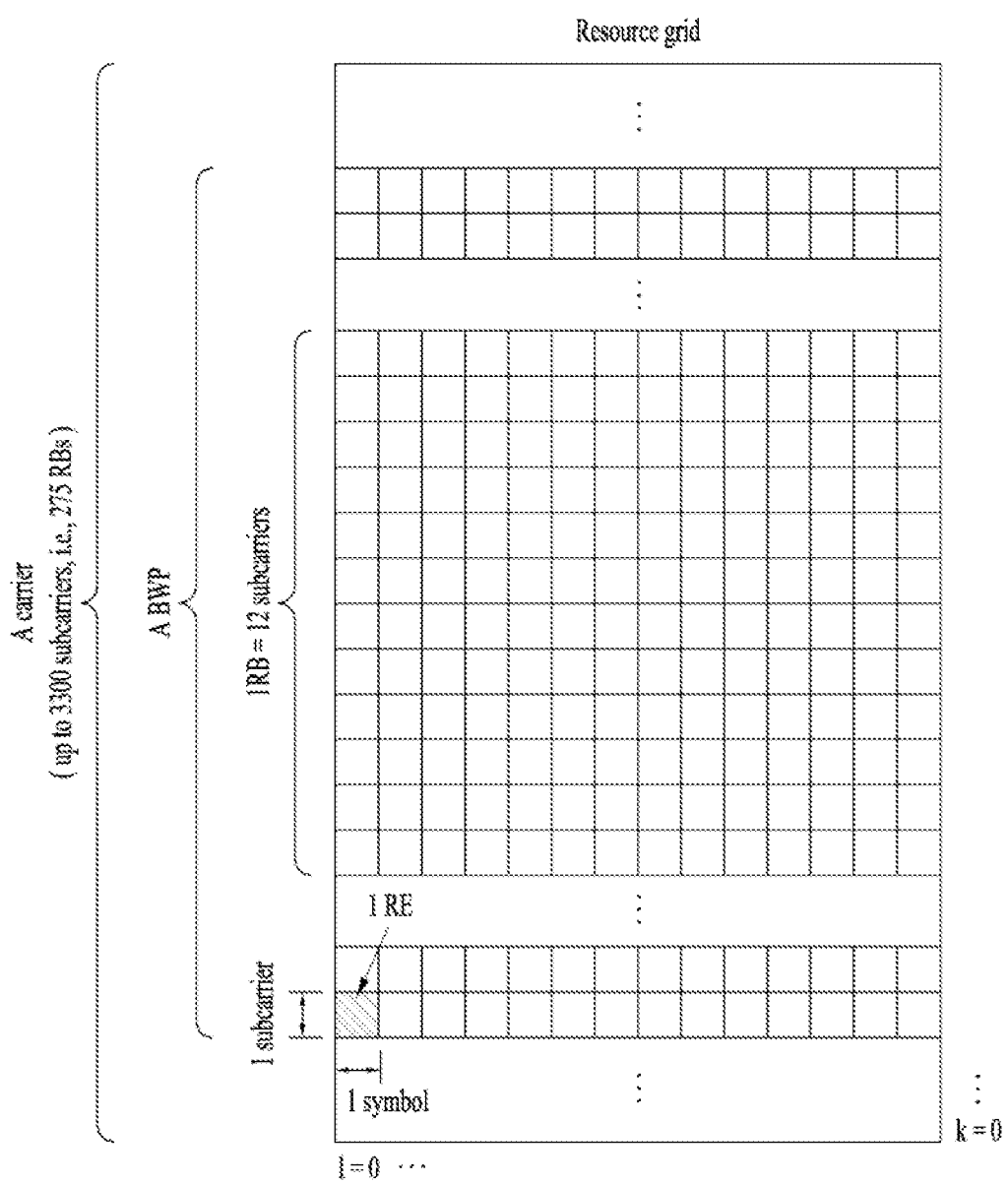
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE), and one complex symbol may be mapped thereto.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
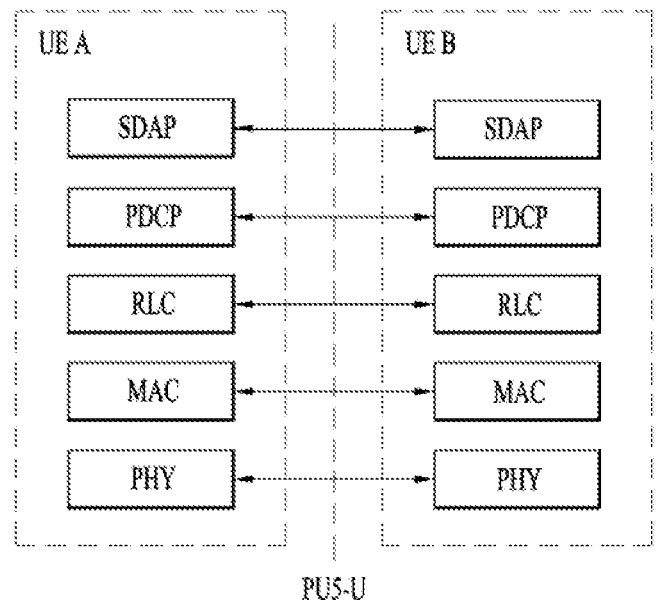
FIG. 9 illustrates a radio protocol architecture for SL communication.
Figure 9:
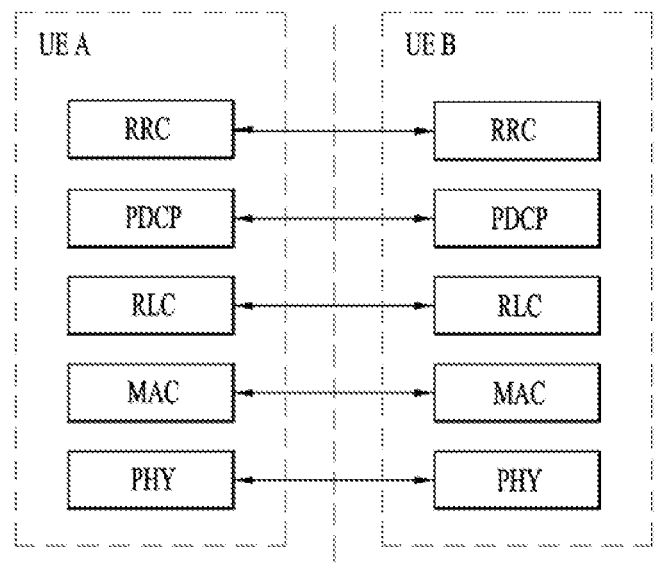

FIG. 9 illustrates a radio protocol architecture for SL communication.

Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
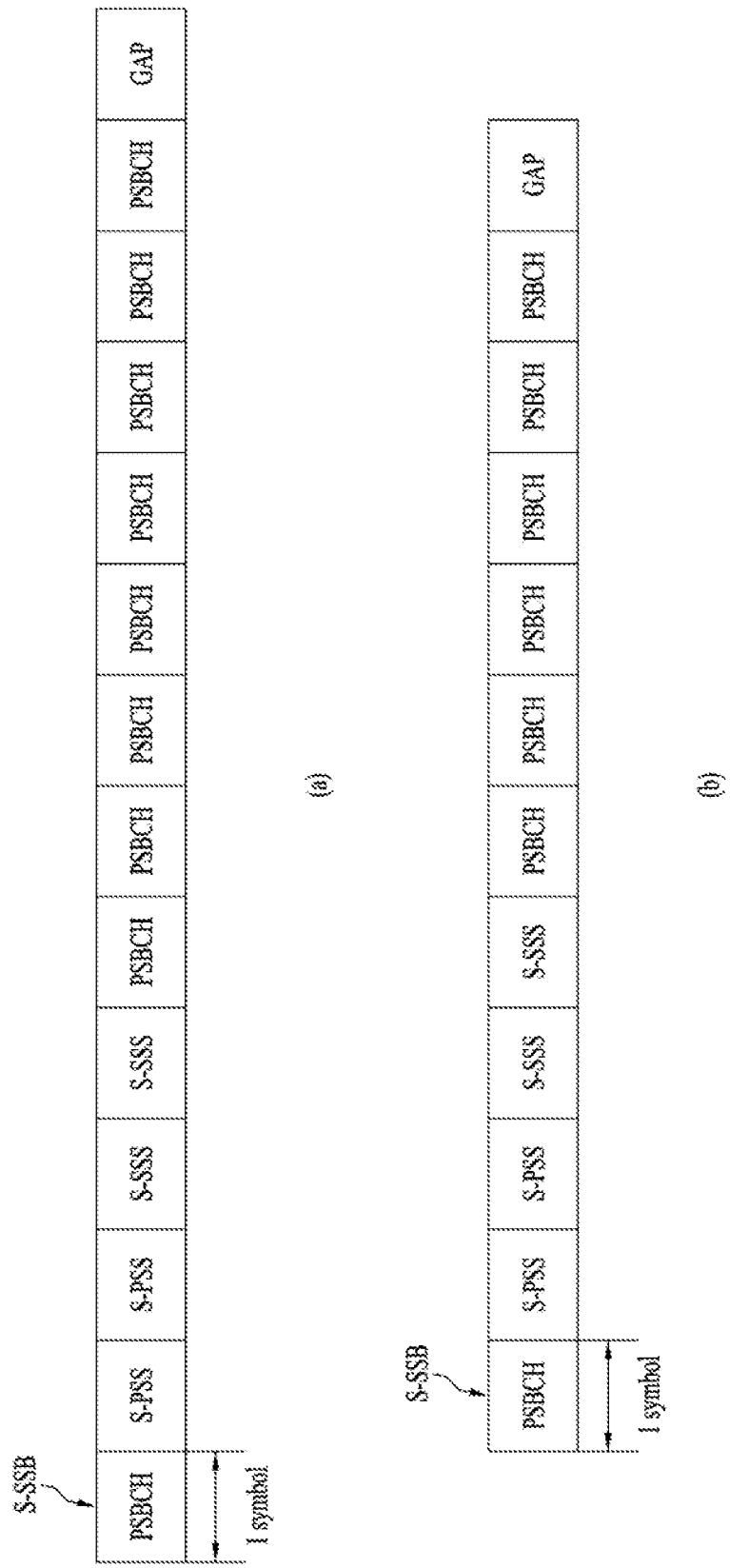
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
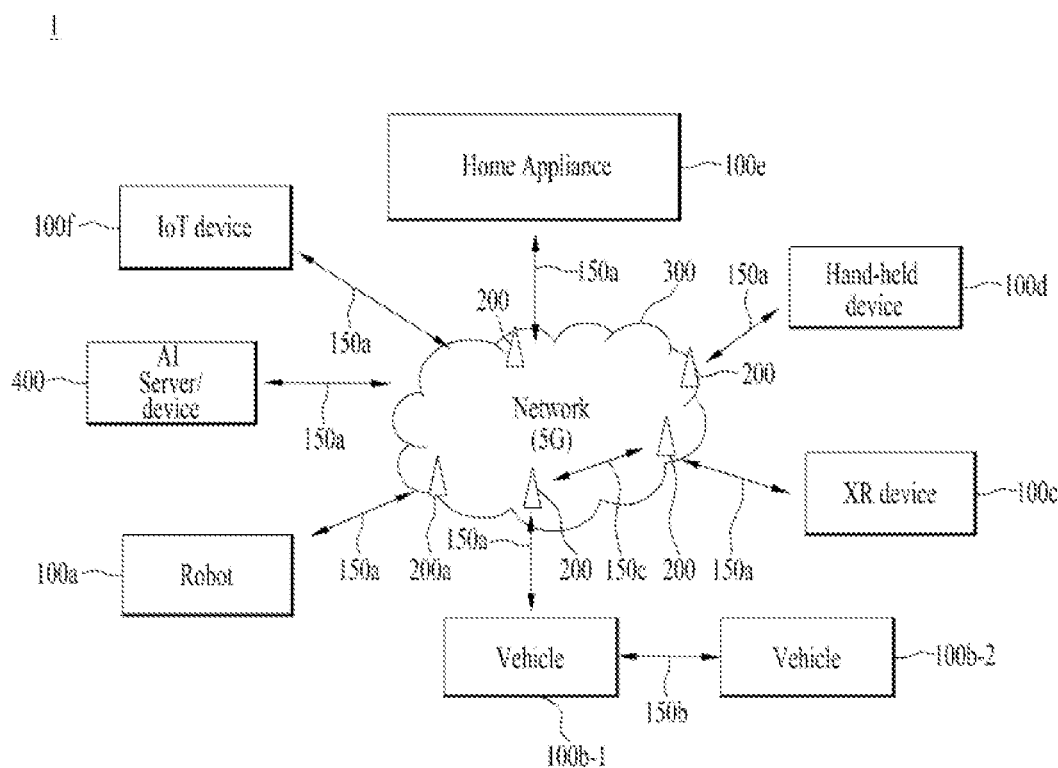
FIG. 20 illustrates a communication system applied to the present disclosure.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
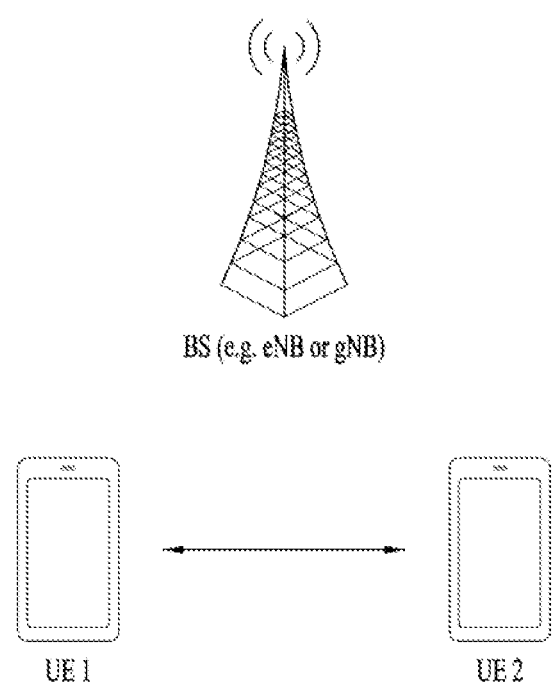
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
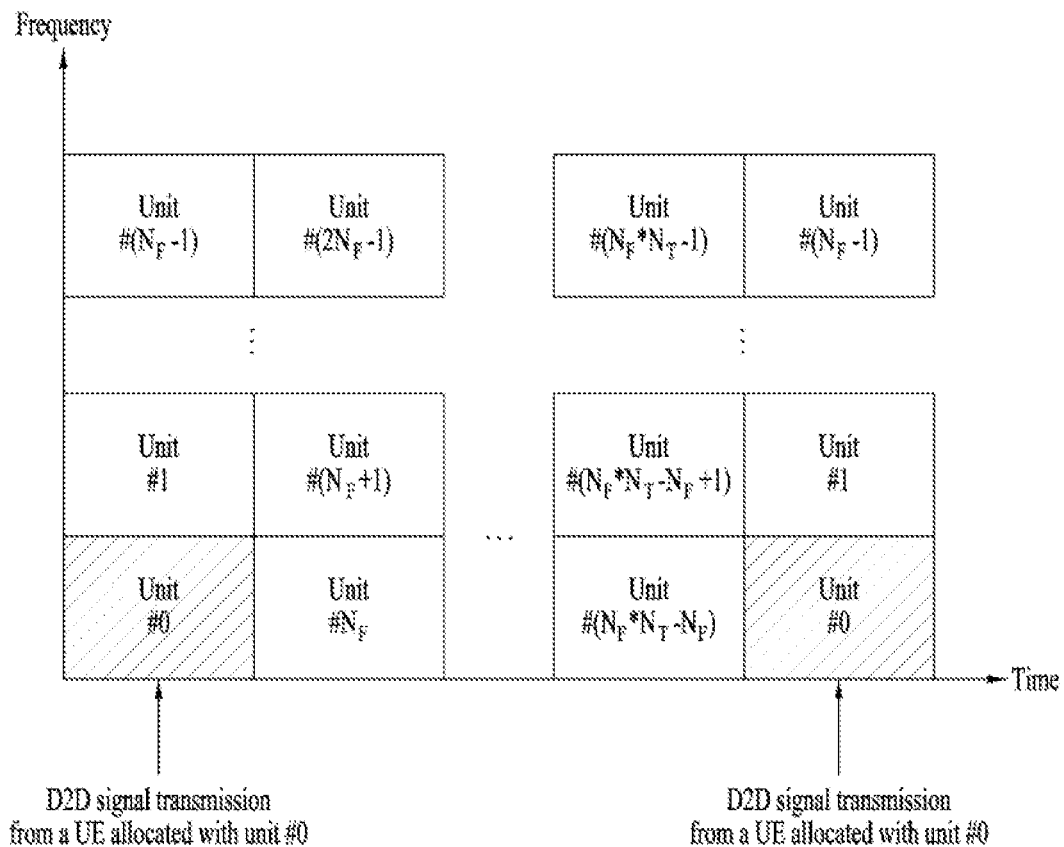
FIG. 12 illustrates resource units for V2X or SL communication.

FIG. 12 illustrates resource units for V2X or SL communication.

Referring to FIG. 12, the frequency resources of a resource pool may be divided into NF sets, and the time resources of the resource pool may be divided into NT sets. Accordingly, a total of NF*NT resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
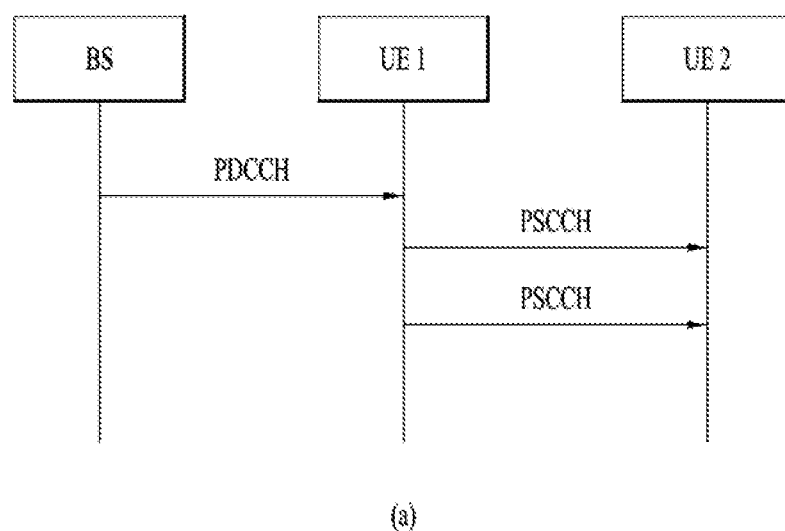
FIG. 13 illustrates a procedure in which UEs perform V2X or SL communication according to a transmission mode.
Figure 13:
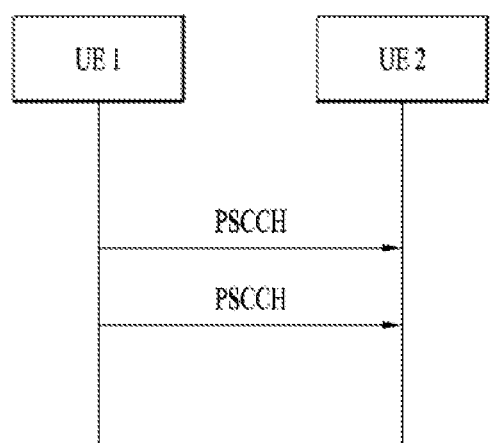

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 24-(*a*) illustrates a UE operation related to NR resource allocation mode 1. For example, LTE transmission mode 1 may be applied to general SL communication, and LTE transmission mode 3 may be applied to V2X communication.

For example, FIG. 13-(*b*) illustrates a UE operation related to LTE transmission mode 2 or LTE transmission mode 4. Alternatively, for example, FIG. 24-(*b*) illustrates a UE operation related to NR resource allocation mode 2.

Referring to FIG. 13-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may represent a slot offset between DCI reception and a first SL transmission scheduled by DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
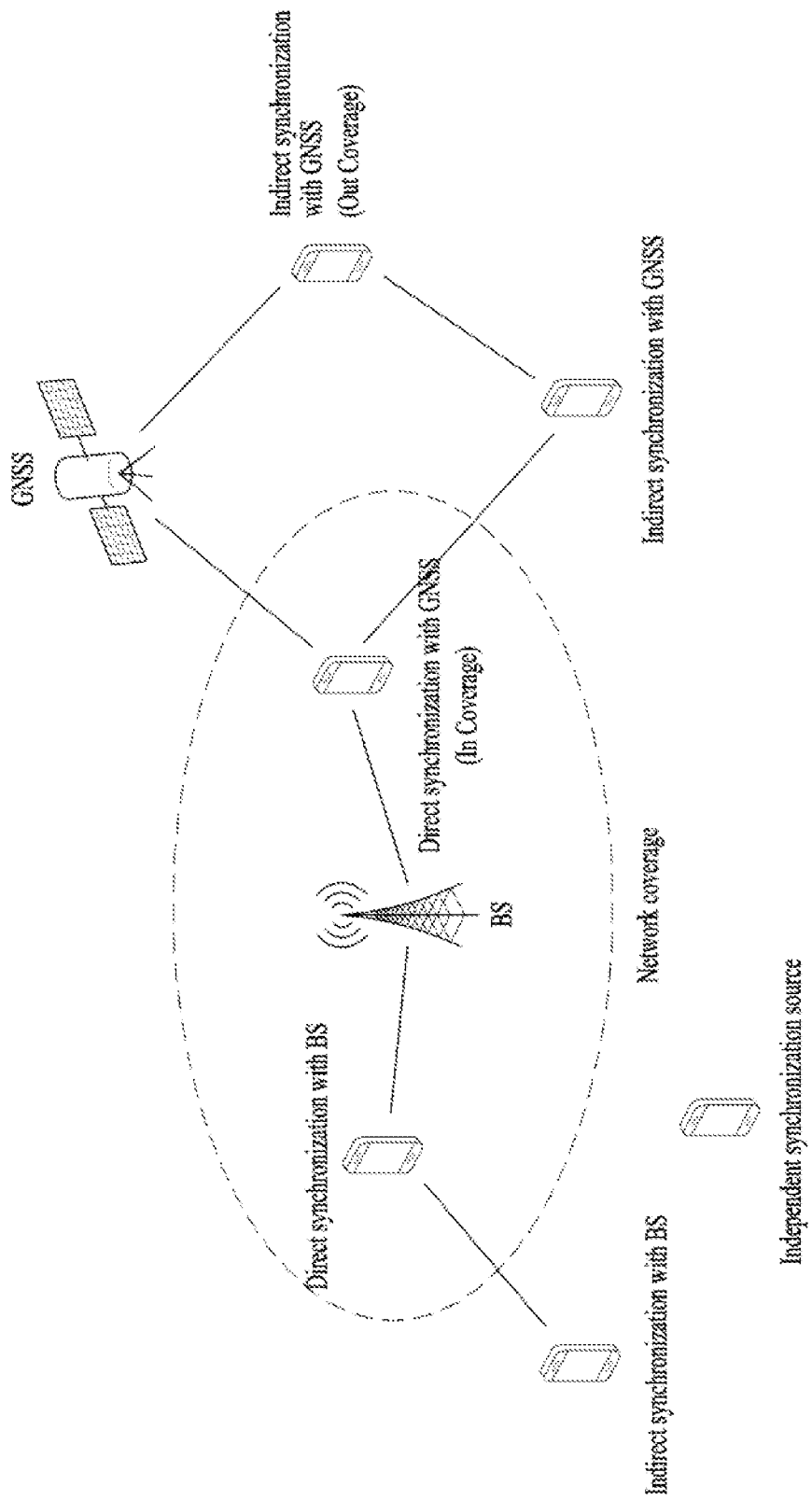
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Tx/Rx Beam Sweep

When a very high frequency such as mmWave is used, beamforming may be generally used in order to overcome a pathloss. In order to use beamforming, the best beam pair should be detected from among several beam pairs between a transmitter and a receiver. This operation may be called beam acquisition or beam tracking from the receiver perspective. In particular, analog beamforming is used for mmWave. Accordingly, in the operation of beam acquisition or beam tracking, a vehicle needs to perform beam sweeping of switching between beams in different directions at different times, using an antenna array thereof.

Assignment of a Beam Acquisition ID for Transmission of a Beam Management Signal/Channel When multiple vehicles are present in the mmWave V2X communication system, an issue may be raised due to half duplex. In consideration of such an issue, the present disclosure proposes an efficient method of assigning a beam acquisition ID for transmission of a beam management signal/channel at different times between vehicles in mmWave vehicle-to-vehicle communication. Further, the present disclosure proposes a method of assigning a beam acquisition ID in the mmWave V2X communication system such that each vehicle (UE) avoids and minimizes collisions in transmitting beam management signals/channels. Specifically, according to the present disclosure, the gNB manages the beam acquisition ID for each zone to avoid collision of the beam acquisition IDs between neighboring UEs. Thereby, the issue caused by half duplex between UEs may be addressed.

Here, the zone may mean an area divided to efficiently manage beam acquisition between the vehicles (or UEs). Alternatively, an area (or coverage) in a cell or a BS may be divided into multiple zones, and zones of a specific region (size) may be preconfigured for the out-of-coverage area. Here, the specific region may be preconfigured from the cell or the BS or pre-configured by a UE. Alternatively, the zone may be physically preconfigured to correspond to an LTE V2X zone or a zone corresponding to a zone ID. Hereinafter, the out-of-coverage area or an area within the BS will be assumed to be a preconfigured area.

The beam acquisition ID may mean a temporary UE ID used in a beam acquisition process for mmWave V2X communication between different vehicles (UEs) in a zone.

The beam acquisition ID is an identifier temporarily assigned in a specific area for mutual beam detection and acquisition between vehicles or UEs, unlike the IMSI, which is a unique UE ID in a cell or a BS, or the C-RNTI, which is a UE ID in a cell or a BS. As described above, the same beam acquisition ID set may be preconfigured for the zones. Alternatively, vehicles to which the same beam acquisition ID is assigned may be present in a zone. For example, in mmWave V2X Sidelink communication, vehicles in areas where the vehicles are difficult to communicate with each other may be assigned or have the same ID. Alternatively, as described above, when opposing lanes are included in one zone and communication between vehicles traveling in opposite directions is unnecessary, UEs assigned with the same beam acquisition ID may be present in the one zone.

Further, the beam management signal or the channel may be a signal that needs to be periodically transmitted for initial beam acquisition or beam recovery in mmWave communication. The beam management signal or channel may include a signal of an SSB in NR Uu.

Figure 15:
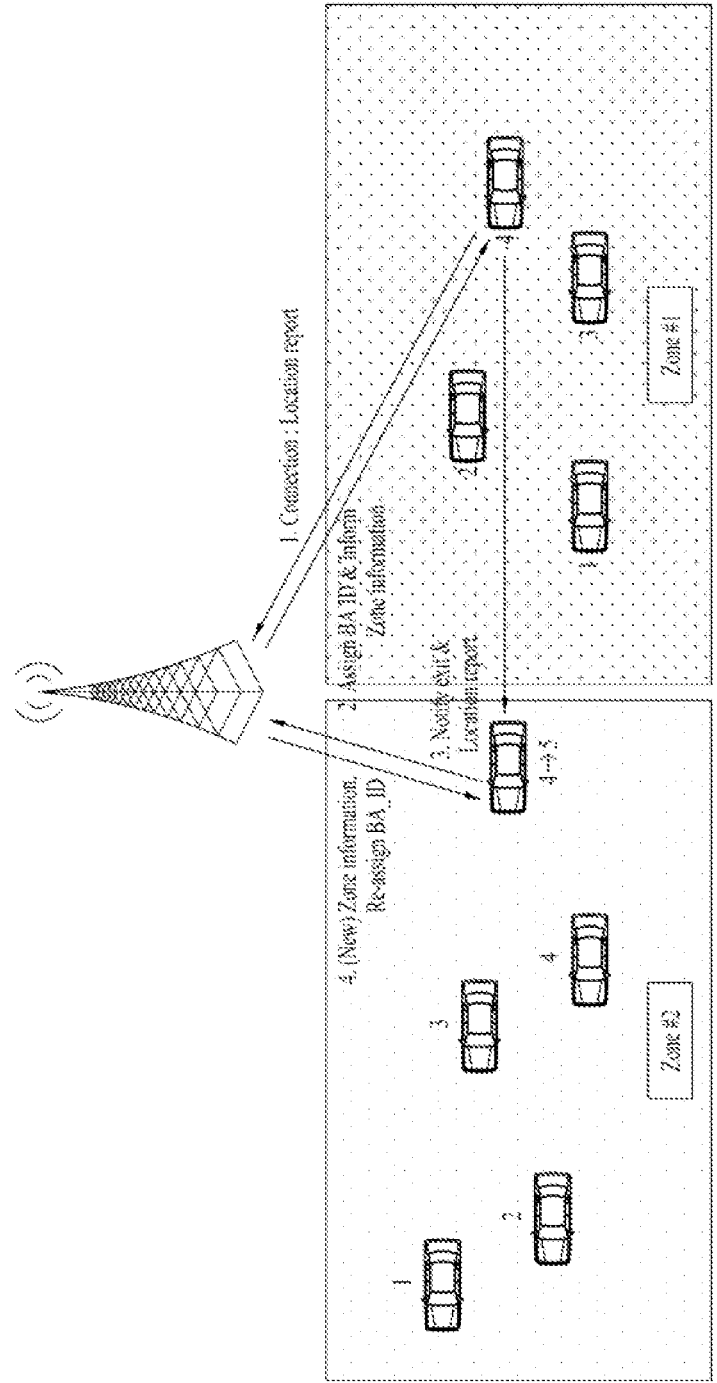
FIG. 15 is a diagram illustrating a method of dividing a preconfigured area into a plurality of zones and a method of assigning a beam acquisition ID.

FIG. 15 is a diagram illustrating a method of dividing a preconfigured area into a plurality of zones based on latitude and longitude and a method of assigning a beam acquisition ID.

Referring to FIG. 15, an area (or a coverage area) in a BS is divided into a plurality of zones. The plurality of zones may have regions corresponding to the zones for assigning a resource pool in 3GPP LTE or NR. Specifically, the plurality of zones may be rectangular areas into which the preconfigured area (or coverage area) is pre-divided according to latitude and longitude. In this case, the UE may specify a corresponding zone based on its own GPS or GNSS information. In addition, the plurality of zones may be assigned a unique zone ID as described in 3GPP LTE or NR.

In this case, the UE may use the zone ID for determination of the resource pool thereof as zone information for assigning the beam acquisition ID. That is, a plurality of zones for assigning the beam acquisition ID may be preconfigured to correspond to zones in LTE or NR for determining a resource pool. The zones in LTE or NR are used to assign a different resource pool for each zone.

Figure 16:
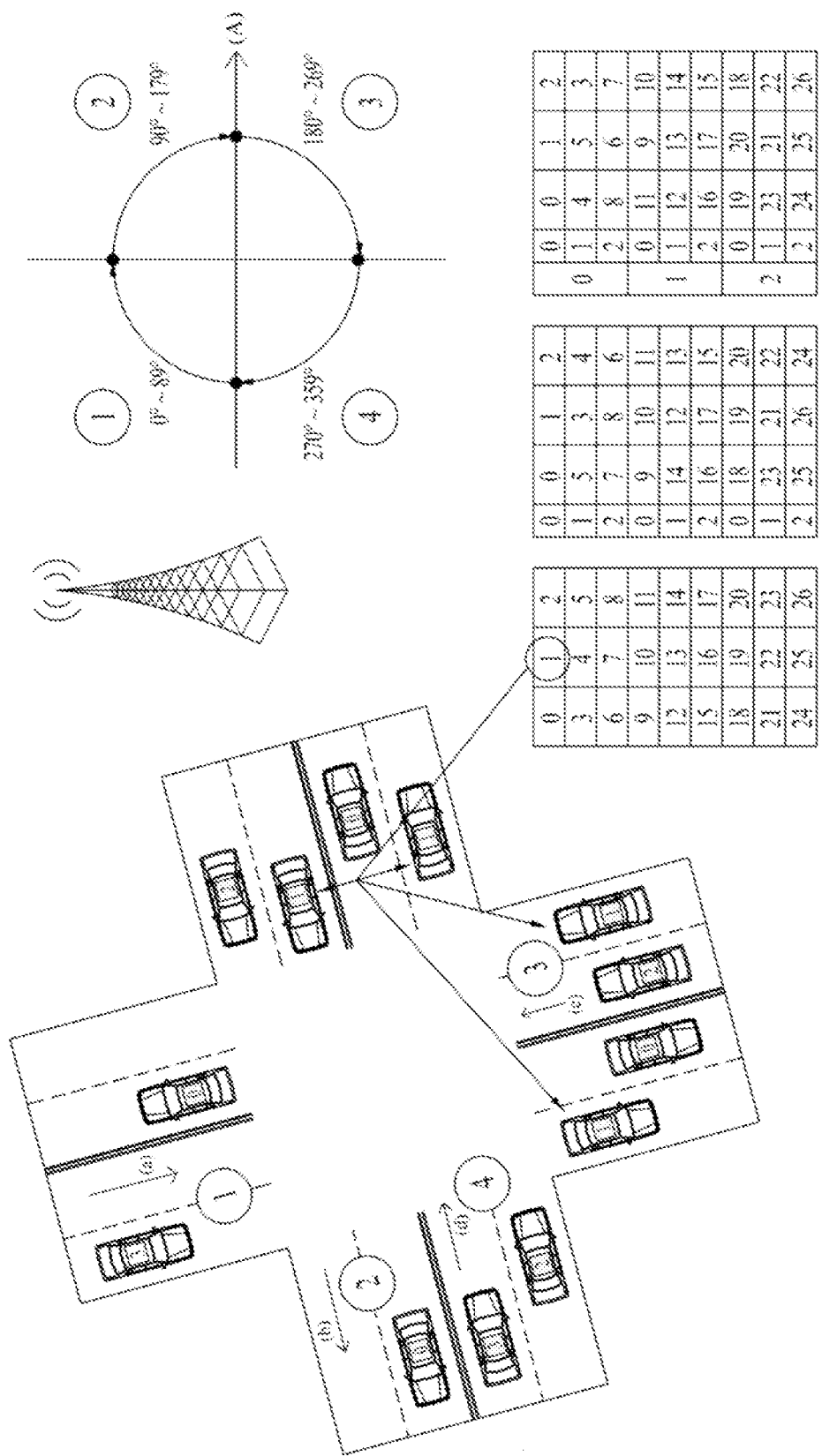
FIGS. 16 and 17 are diagrams illustrating a method of dividing a preconfigured area into a plurality of zones.
Figure 17:
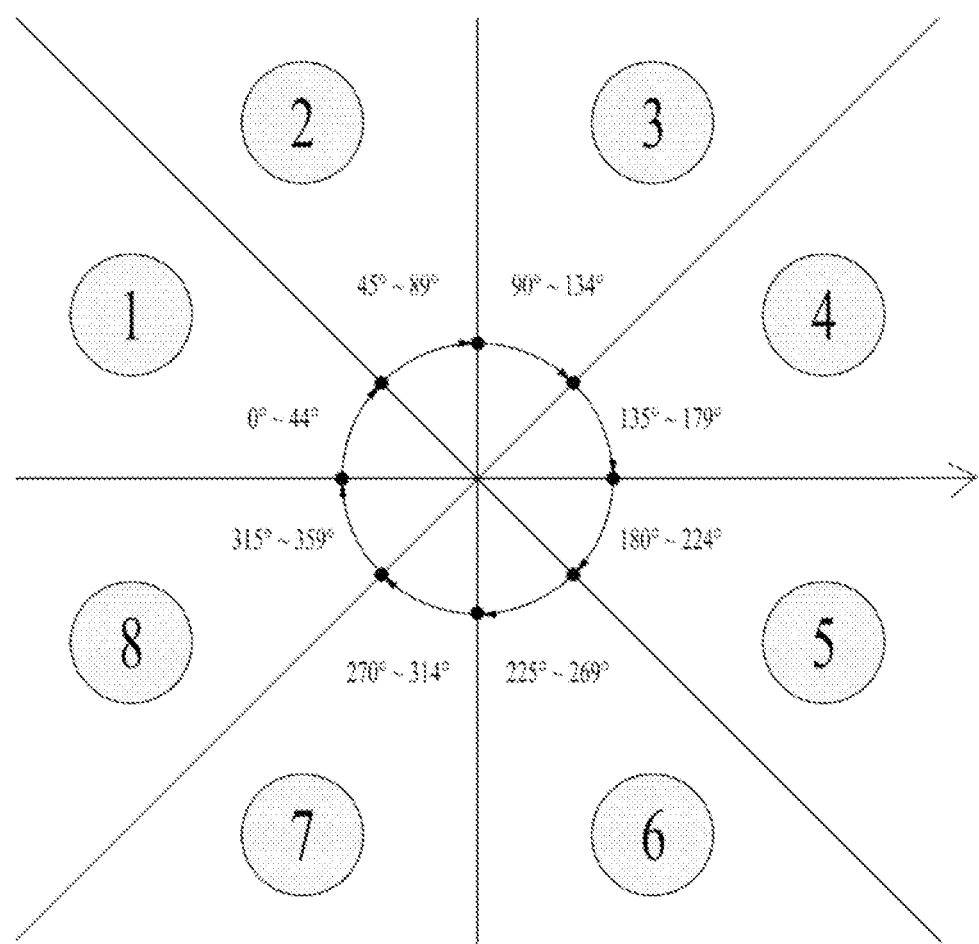

FIGS. 16 and 17 are diagrams illustrating a method of dividing a preconfigured area into a plurality of zones.

The plurality of zones may be configured to have different zone ranges according to surrounding environments (e.g., cities, highways, etc.) and/or coverage of mmWave.

The beam management signal has a high pathloss due to use of a high frequency such as mmWave and thus has a significantly narrow communication coverage. Accordingly, the plurality of zones needs to be configured independently of the zones defined in LTE V2X. In other words, since the beam acquisition ID is an identifier that may overlap or be shared with an area outside the coverage of the mmWave, the plurality of zones may be preconfigured based on the coverage of mmWave and/or the surrounding environment, independently of the zones defined in LTE V2X. That is, the preconfigured area may be divided into a plurality of zones in consideration of a range in which a collision of beam management signals does not occur even when the same beam acquisition ID set is shared.

In this case, in mmWave V2X communication, each of the plurality of zones may use the same beam acquisition ID set. Here, the beam acquisition ID set does not need to include as many beam acquisition IDs as all UEs in the preconfigured area. Accordingly, the beam acquisition ID set may include the beam acquisition ID, which has a relatively small size. In addition, according to the proposed embodiments, utilization of the beam acquisition ID may be significantly enhanced and the number of bits occupied by the beam acquisition ID may be significantly reduced.

The plurality of zones may have various geometric shapes depending on the surrounding environment. Specifically, the plurality of zones may be divided into polygonal shapes, and the size of polygonal zones may vary depending on the surrounding environment. For example, the zone in an urban environment may be smaller than the size of the zone in an environment other than the urban environment. Alternatively, the zone for the roads may be smaller than the size of the zone for the periphery of the roads.

Alternatively, a plurality of zones within a preconfigured area is zones divided by a specific angle based on a predetermined reference direction. The predetermined reference direction may be determined based on geographical features of the preconfigured area. For example, the reference direction may be preconfigured based on latitude and longitude, or may be predetermined to correspond to the direction of extension of the road included in the preconfigured area. In addition, the specific angle may be predetermined according to the number of UEs included in the preconfigured area or the situation of the road. Dividing a plurality of zones in this way may be useful when availability of mmWave V2X communication is determined by the travel direction of the UE.

Referring to FIG. 16, a preconfigured area is conceptually divided into zones 1 to 4 by 90 degrees, which is the specific angle. Here, the reference direction corresponds to the direction (A) extending from left to right as illustrated in FIG. 16. For example, the preconfigured area may be divided into a first zone 1, which is between 0 and 89 degrees with respect to the reference direction, a second zone 2, which is between 90 and 179 degrees, a third zone 3, which is between 180 and 269 degrees, and a fourth zone 4, which is between 270 and 359 degrees. The first zone may be divided into an area for LUEs whose movement direction is between 0 and 89 degrees. The second zone may be an area for UEs whose movement direction is between 90 and 179 degrees. The third zone may be an area for UEs whose movement direction is between 180 and 269 degrees. The fourth zone may be an area for UEs whose movement direction is between 270 and 360 degrees.

For example, as shown in FIG. 16, the first zone 1 may include an area of a lane in which vehicles move in a first direction a, and the second zone 2 may include an area of a lane in which vehicles move in a second direction b. Similarly, the third zone 3 may include an area of a lane in which vehicles move in a third direction c, and the fourth zone 4 may include an area of a lane in which vehicles move in a fourth direction d.

Referring to FIG. 17, the preconfigured area includes eight zones divided at intervals of 45 degrees with respect to the reference direction.

The specific angle by which each of the plurality of zones is divided may be set differently according to the complexity of the road. That is, as the road network becomes complicated, the specific angle may be reduced. For example, when the specific angle for the rural road network is 90 degrees, the specific angle for the road network in the city may be further reduced and preset to 30 degrees. In this case, as the road network becomes more complicated, the preconfigured area may be divided into more zones. For example, the preconfigured area including the zones according to FIG. 16 may have lower road network complexity than the preconfigured area including the zones according to FIG. 17.

Hereinafter, methods of assigning beam acquisition IDs based on a plurality of zones divided by at least one division method among the above-described methods will be described in detail.

Figure 18:
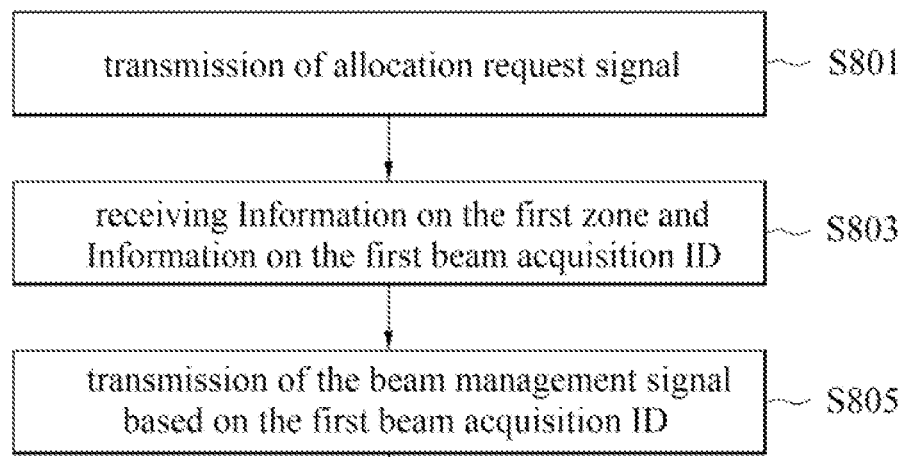
FIG. 18 is a diagram illustrating a method of assigning a zone-based beam acquisition ID to a UE.

FIG. 18 is a diagram illustrating a method of assigning a zone-based beam acquisition ID to a UE.

The UE may be assigned a beam acquisition ID from a BS based on a plurality of zones included in the preconfigured area. Here, as described above, the beam acquisition ID is an identifier assigned for the purpose of identifying beam management signals between UEs within a specific zone. In addition, the plurality of zones may be divided based on geographic information (latitude, longitude) (or a first division method), as shown in FIG. 15. Alternatively, as illustrated in FIGS. 16 and 17, the plurality of zones may be divided based on a predetermined angle (or a second division method).

Alternatively, the preconfigured area may be divided into a plurality of regions by the first division method, and the plurality of regions may be divided into a plurality of zones using the second division method. That is, a combination of the first division method and the second division method may be used to divide the plurality of regions by the first division method and then by the second division method. Thereby, the preconfigured area may be subdivided.

Referring to FIG. 18, the UE may transmit, to a BS, an assignment request signal for requesting assignment of a beam acquisition ID related to one of the plurality of zones (S801). Here, the assignment request signal may include current location information and/or mobility information (such as speed, traveling direction, and acceleration) about the UE. The UE transmitting the assignment request signal may be the gNB or a UE attempting an initial connection to the BS.

Alternatively, the UE may attempt a beam search for a predetermined time (or a preset time) before transmitting the assignment request signal. For example, when the mmWave V2X service is triggered, the mmWave V2X sidelink communication vehicle or UE may attempt a beam search for a predetermined time before transmitting the assignment request signal. The UE may transmit, to the BS, the assignment request signal including information about a neighboring UE (or vehicle) detected for the predetermined time. Here, the information about the neighboring UEs may include whether neighboring UEs are present, the number of detected neighboring UEs, and/or the beam acquisition ID for the neighboring UEs.

Next, the UE may receive, from the BS, information about a first zone, which is a zone specified among the plurality of zones according to the location information or mobility information thereof, and/or information about a first beam acquisition ID to be used to identify a beam management signal in the first zone (S803). That is, the UE may acquire information about the first zone, which is a zone specified among the plurality of zones according to the mobility information thereof, and the first beam acquisition ID assigned to the first zone, in response to the assignment request signal. Here, the information about the first zone may include a zone number, a zone ID, and/or information related to an area (e.g., coordinates of both diagonal ends or vertices of a rectangle). Thereafter, the UE may use the acquired first beam acquisition ID for the purpose of identifying the beam management signal in the first zone.

Alternatively, the plurality of zones may be divided into various shapes based on latitude and longitude (a first division method) as described with reference to FIG. 15 and may be divided (a second method) based on a predetermined angle as described with reference to FIGS. 16 and 17. When the plurality of zones is divided by the first division method, the first zone may be a zone determined from among the plurality of zones based on the location information about the UE. Alternatively, when the plurality of zones is divided by the second division method, the first zone may be a zone determined based on the mobility information (i.e., movement direction) about the UE.

For example, when the plurality of zones is divided by the first division method, the first zone is determined as a zone corresponding to the latitude and longitude included in the location information about the UE among the plurality of zones. When the plurality of zones is divided by the second division method, the first zone may be determined as a zone corresponding to an angle between the preconfigured reference direction and the movement direction of the UE.

Alternatively, the first beam acquisition ID is an identifier assigned by the BS as one of the remaining beam acquisition IDs except for the beam acquisition ID assigned to other UEs for the determined first zone in the beam acquisition ID set. The first beam acquisition ID may be a valid identifier in the first zone, and may be used as an identifier for identifying the beam management signal of the UE in the first zone. The first beam acquisition ID may be independently assigned regardless of the beam acquisition ID assigned to each of the plurality of zones except for the first zone. That is, the first beam acquisition ID may be assigned in the same manner as the beam acquisition IDs of other UEs located in other zones.

Alternatively, the assignment request signal may include information about neighboring UEs searched or detected for the preset time. In this case, the first beam acquisition ID may be assigned among the remaining beam acquisition IDs except for both the beam acquisition IDs of other UEs for the first zone and beam acquisition IDs for the neighboring UEs in the beam acquisition ID set. For example, since the beam acquisition ID for the beam management signal is basically assigned using the same beam acquisition ID set for the plurality of zones, the same beam acquisition ID as the first beam acquisition ID may be assigned to UEs included in different zones. However, even when the beam acquisition IDs of neighboring UEs included in the assignment request information are for the UEs included in different zones, there is a possibility of collision between the beam management signals of the UE and the neighboring UEs. In consideration of the possibility of collision, the first beam acquisition ID may be determined additionally considering even the beam acquisition IDs for the neighboring UEs as described above.

Alternatively, when a plurality of zones is divided by the second division method, the first beam acquisition ID may be determined as one of the remaining beam acquisition IDs except for the beam acquisition IDs assigned to the other UEs that have entered according to the direction (or first zone) in which the UE enterers the zone.

Alternatively, the first beam acquisition ID may be assigned to overlap with another UE in the first zone based on the environment of the first zone. For example, when the first zone includes opposing lanes and the mmWave-based V2V communication is unnecessary between UEs traveling in opposite directions, the first beam acquisition ID may be assigned in the first zone in an overlapping manner for each road direction (e.g., up line, down line). That is, the first zone may independently configure or manage the beam acquisition ID for each road direction. For example, when there are two entry directions (e.g., left and right) to zone #X, the beam acquisition ID may be assigned or managed independently (namely, the beam acquisition ID may be duplicated or shared between entry directions). In this case, it has the same effect as the case where the beam acquisition ID is used twice.

Alternatively, further considering a time at which the beam acquisition ID is assigned to each UE for the first zone, the first beam acquisition ID may overlap with the beam acquisition ID assigned to other UEs in the first zone. For example, when all available beam acquisition IDs (i.e., all beam acquisition IDs included in the beam acquisition ID set) are already assigned in the first zone, the first beam acquisition ID may be assigned as an ID corresponding to the oldest beam acquisition ID assigned to the UE for the first zone.

As described above, the beam acquisition ID is an identifier for identifying a beam management signal in one zone. Accordingly, the plurality of zones may share the same beam acquisition ID set. In this case, even if the UEs have different UE IDs (C-RNTIs) within the preconfigured area, the UEs may be assigned the same beam acquisition ID when the UEs are in different zones. For example, the beam management signal for beam acquisition has significantly narrow communication coverage because it uses high frequencies such as mmWave and thus undergoes high pathloss. Therefore, considering that it is not necessary to assign beam acquisition IDs corresponding to an in-coverage area or preconfigured area of one BS, the proposed embodiments may divide the preconfigured area into a plurality of zones such that the same beam acquisition ID set may be shared between zones. That is, abeam acquisition ID set may be reused for the zones.

In addition, the plurality of zones may be divided by the first division method or the second division method, further considering at least one of a transmission periodicity of the beam management signal, a transmission window size, a road environment (such as city, highway, and an average or maximum number of vehicles in a zone), a employed frequency (Sidelink), and a maximum target communication distance.

Next, the UE may transmit a beam management signal based on the first beam acquisition ID (S805). When the UE transmits the beam management signal, the first beam acquisition ID may be used to identify the beam management signal in the first zone. Alternatively, the UE may transmit a separate signal for its own zone information and/or the first beam acquisition ID to neighboring UEs.

Alternatively, the UE may transmit a reassignment request for requesting an update of the first beam acquisition ID to the BS based on the mobility information or location information about the UE or a result of detection of neighboring UEs. Here, the reassignment request signal may include previously received information about the first zone, current location information (or mobility information), and/or beam acquisition ID information. Here, the beam acquisition ID may include at least one of a beam acquisition ID currently assigned to the UE, a beam acquisition ID for other UEs maintaining a connection, and/or a beam acquisition ID of neighboring UEs detected (or newly detected) by the beam search.

Specifically, the UE may determine whether to transmit the reassignment request signal based on the mobility information or location information about the UE or the result of detection of neighboring UEs. For example, the UE may transmit the reassignment request signal in the following cases: the UE reaches the end of the current zone or is out of the zone; the travel direction of the UE is changed by a specific angle or more in the same zone (e.g., the steering wheels of the vehicle containing the UE are operated by a specific angle or more by a left turn, right turn, U-turn, etc.); the UE moves at a preset threshold speed or more for more than a preset threshold time; or no other UE is detected for the preset threshold time.

When the UE determines that the reassignment request signal needs to be transmitted, the UE may stop transmitting the beam management signal and perform a beam search for a predetermined time. The UE may detect other nearby UEs and acquire a beam acquisition ID for the other nearby UEs. The UE may transmit a reassignment request signal containing the beam acquisition ID for the other UEs detected according to the beam search, the beam acquisition ID of the UE, and/or current location information to the BS.

For example, when the UE leaves the first zone (or enters a new zone), it may perform a beam search for neighboring UEs for a predetermined time, and transmit a reassignment request signal for requesting assignment of a new beam acquisition ID (or update of the first beam acquisition ID) to the BS or gNB.

Alternatively, the UE may receive a response signal including second zone information as new zone information and/or information about a second beam acquisition ID as an updated beam acquisition ID from the BS. The second beam acquisition ID may be determined based on the information included in the reassignment request signal, available beam acquisition IDs in the zone which the UE newly enters, beam acquisition IDs assigned to the UEs entering in the corresponding direction and/or times of the assignment, and/or a transmission time for each beam acquisition ID.

Alternatively, the second beam acquisition ID may be assigned, additionally considering location information periodically transmitted by UEs included in the zone (namely, the BS may assign the second beam acquisition ID based on the information included in the signal transmitted by the UE and the location information periodically transmitted by UEs included in the zone). When all beam acquisition IDs included in the beam acquisition ID set are already assigned, the BS may assign any one of the remaining beam acquisition IDs except for the beam acquisition IDs detected by the UE as the second beam acquisition ID in an overlapping manner.

When there is no other UEs assigned the first beam acquisition ID in the second zone, the second beam acquisition ID may be reassigned equally as the first beam acquisition ID. Alternatively, the UE may receive a response signal including the second zone information from the BS. In this case, the UE may estimate that the second beam acquisition ID has been assigned equally as the first beam acquisition ID, based on the response signal not including the beam acquisition ID.

Alternatively, the UE in the out-of-coverage state may perform a beam search for neighboring UEs for the predetermined time when the reassignment signal needs to be transmitted. In this case, the UE may directly update the first beam acquisition ID based on the result of the beam search. Specifically, when the reassignment signal needs to be transmitted, the UE may stop transmitting the beam management signal and detect beam acquisition IDs for neighboring UEs for a preset detection time. The UE may determine the second beam acquisition ID based on the beam acquisition IDs detected for the preset time. For example, when the detected beam acquisition IDs overlap with the first beam acquisition ID (or the beam acquisition ID assigned before the specific condition is satisfied), the UE may update the first beam acquisition ID to the second beam acquisition ID. Alternatively, when the detected beam acquisition IDs do not overlap with the first beam acquisition ID, the UE may assign the second beam acquisition ID equally as the first beam acquisition ID. In this case, the UE may broadcast the updated second beam acquisition ID to neighboring UEs or transmit the same to connected UEs.

Figure 19:
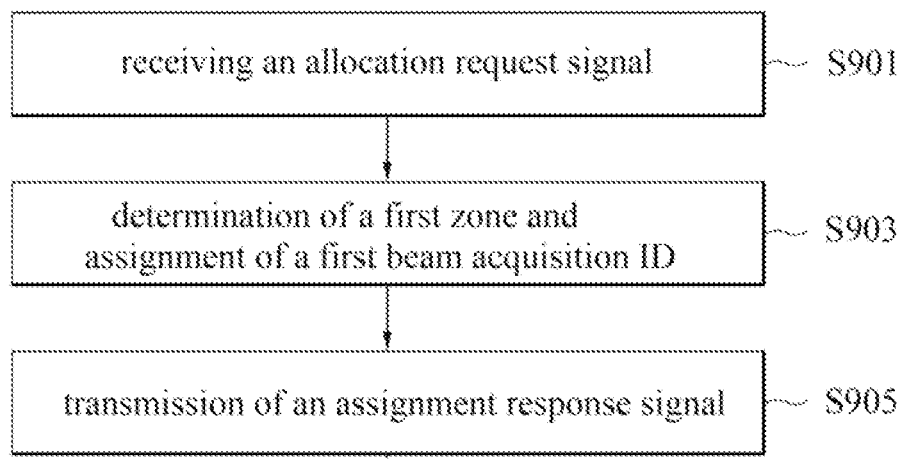
FIG. 19 is a diagram illustrating a method of assigning a beam acquisition ID by a base station.

FIG. 19 is a diagram illustrating a method of assigning a beam acquisition ID by a base station.

Referring to FIG. 19, the BS may receive an assignment request signal from a UE in the preconfigured area (S901). The assignment request signal may include location information (and/or mobility information) about the UE and/or information about neighboring UEs detected by the UE (the number and beam acquisition ID of detected neighboring UEs, etc.).

Next, the BS may assign a beam acquisition ID for the UE based on the assignment request signal. The BS may determine a first zone, which is a zone corresponding to the location of the UE among the plurality of zones, and determine a first beam acquisition ID for the UE among the remaining beam acquisition IDs except for the beam acquisition IDs assigned to other UEs in the first zone (S903).

Alternatively, the BS may determine a zone corresponding to each of the UEs based on geographical information or location information about each of the UEs, or may determine a zone corresponding to each of the UEs based on a travel direction of each of the UEs among the plurality of zones. Specifically, when the plurality of zones is configured by dividing the preconfigured area by a first division method, the BS may determine a corresponding zone for each UE based on the geographic information or location information about the UEs. Alternatively, when the plurality of zones is configured by dividing the preconfigured area by a second division method, the BS may determine a corresponding zone for each UE based on mobility information (or travel direction) about each of the UEs.

Alternatively, the BS may determine the first beam acquisition ID, further considering beam acquisition IDs of neighboring UEs included in the assignment request information or the number of detected neighboring UEs. Since the BS basically assigns the beam acquisition ID for the beam management signal using the same beam acquisition ID set for the plurality of zones, it may assign the same beam acquisition ID to UEs included in different zones. However, even when the beam acquisition IDs of neighboring UEs included in the assignment request information are for the UEs included in different zones, there is a possibility of collision between the beam management signals. Accordingly, when beam acquisition IDs for the detected neighboring UEs are included in the assignment request information, the BS may assign the first beam acquisition ID, additionally considering the beam acquisition IDs for the neighboring UEs. Specifically, the BS may determine or assign the first beam acquisition ID for the UE among the beam acquisition IDs except for the beam acquisition IDs assigned to the UEs included in the first zone and the beam acquisition IDs for the detected neighboring UEs. The BS may transmit the assigned first beam acquisition ID and information about the first zone to the UE.

Alternatively, when all beam acquisition IDs in the beam acquisition ID set corresponding to the first zone are already assigned, the BS may assign overlapping beam acquisition IDs in the first zone based on times when the UEs enter the first zone. For example, the BS may assign the beam acquisition ID for a UE that has been assigned the beam acquisition ID earliest among the UEs entering the first zone as the first beam acquisition ID.

Next, the BS may transmit an assignment response signal including information about the first zone and the first beam acquisition ID to the UE (S905). In this case, the BS may include information about the first zone and beam acquisition IDs assigned to other UEs located in the first zone in addition to the first beam acquisition ID in the assignment response signal.

Alternatively, the BS may receive a reassignment request signal including the first beam acquisition ID from the UE. The reassignment request signal may include at least one of current location information of the UE, the first zone that the UE has already received, the first beam acquisition ID, and beam acquisition ID information about neighboring UEs detected for a predetermined period. The reassignment request signal may be transmitted by the UE in the following cases: the travel direction of the UE is changed by a specific angle or more in the same zone (e.g., the steering wheels of the vehicle containing the UE are operated by a specific angle or more by a left turn, right turn, U-turn, etc.); the UE moves at a preset threshold speed or more for more than a preset threshold time; or no other UE is detected for the preset threshold time.

The BS may update the first beam acquisition ID for the UE based on the information included in the reassignment request signal. The BS may update the first beam acquisition ID based on at least one of current location information (and/or mobility information) about the UE included in the reassignment request signal, the first zone that the UE has already received, the first beam acquisition ID, and beam acquisition ID information about neighboring UEs detected for a predetermined period in the same manner as in assigning the first beam acquisition ID. The BS may transmit information about the second beam acquisition ID to which the first beam acquisition ID is updated and/or a second zone corresponding to the current location information (and/or mobility information) about the UE to the UE.

Alternatively, when the first beam acquisition ID is not assigned to the second zone, the BS receiving the reassignment request signal may assign the same ID as the first beam acquisition ID as the second beam acquisition ID.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
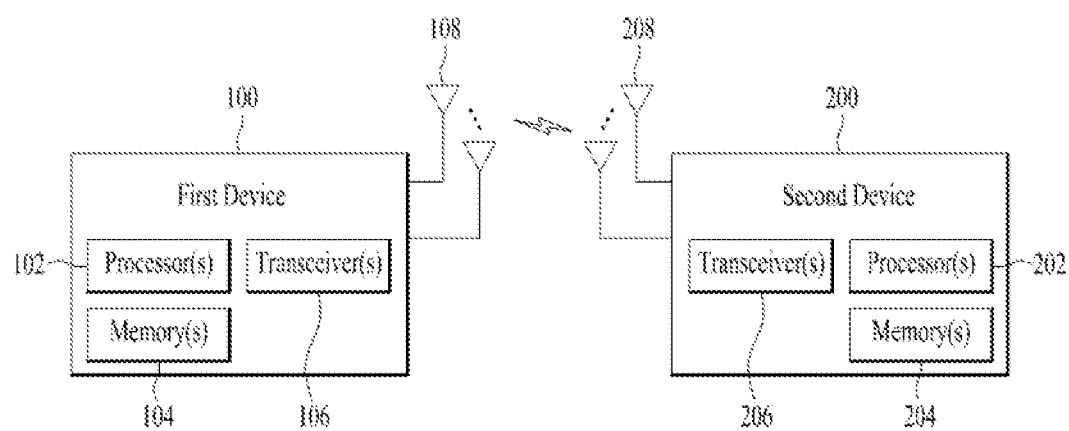
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the chipset may include a processor 102 and a memory 104. The memory 104 may contain at least one program capable of performing operations related to embodiments described with reference to FIGS. 16 and 17. The processor 102 may control the RF transceiver to transmit, to a BS, an assignment request signal for requesting assignment of a beam acquisition ID related to one of the plurality of zones and to acquire, from the BS, information about a first zone specified based on the assignment request signal among the plurality of zones and information about a first beam acquisition ID for identification of a beam management signal in the first zone. Here, the first zone may be a zone specified based on the movement direction of the UE among the plurality of zones.

Here, as described with reference to FIGS. 15 to 19, the plurality of zones may be configured to be pre-divided in the preconfigured area based on a predetermined reference direction and a specific angle. For example, the movement direction of the UE may be a movement direction within a first angle related to the first zone. That is, the processor 102 may request a beam acquisition ID for any one of a plurality of zones using the transceiver 106, and acquire information about a first zone, which is a specific zone corresponding to the movement direction of the UE, and information about the first beam acquisition ID to be used for the first zone. In this case, the processor 102 may use the acquired first beam acquisition ID to identify a beam management signal in the first zone (or to include the first beam acquisition ID in the beam management signal).

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s)

202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
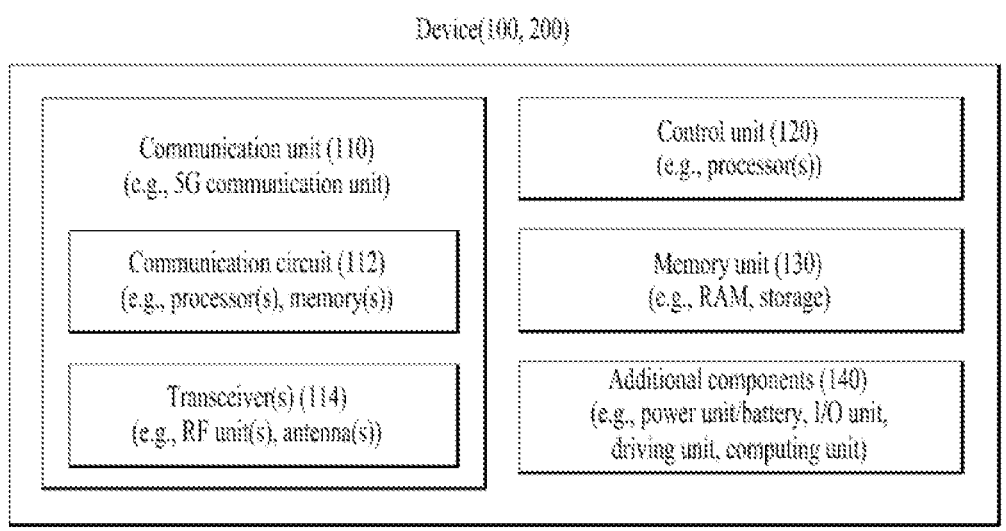
FIG. 22 illustrates another example of a wireless device to which the present disclosure is applied. The wireless device may be implemented in various forms according to use-examples/services.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Examples of Mobile Devices to which the Present Disclosure is Applied

Figure 23:
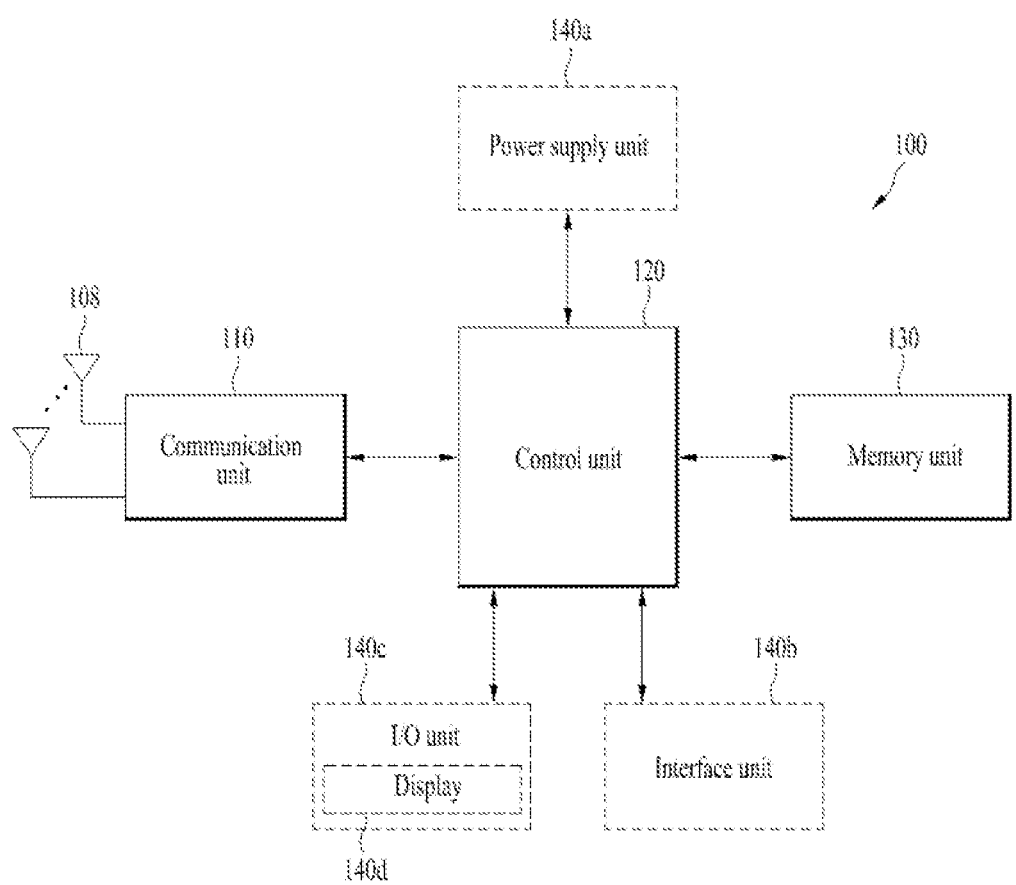
FIG. 23 illustrates a hand-held device applied to the present disclosure.

FIG. 23 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
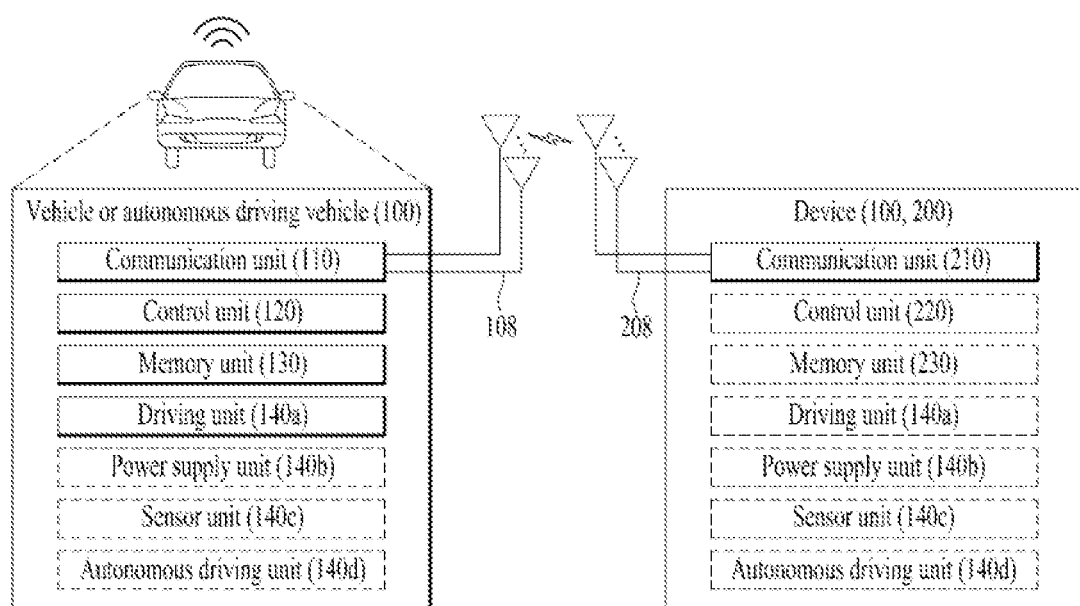
FIG. 24 illustrates a vehicle or an autonomous driving vehicle applied to the present disclosure.

Examples of Vehicles or Autonomous Vehicles to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140a, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method of transmitting a sidelink signal, by a user equipment (UE), in a wireless communication system supporting a sidelink, the method comprising:

receiving first configuration information for a resource pool related to the sidelink from a base station;

receiving second configuration information for configuring a plurality of zones from the base station;

measuring at least one of a position and mobility of the UE;

determining a specific zone related to the position of the UE among the plurality of zones;

transmitting, to a base station, a first signal including information on at least one of the position and the mobility of the UE;

receiving a second signal, from the base station, including information on a first beam acquisition ID for identification of a beam management signal; and transmitting the sidelink signal in the resource pool based on the first beam acquisition ID, wherein the first beam acquisition ID is one of beam acquisition IDs configured for a first sub-zone related to a movement direction of the UE among a plurality of sub-zones based on the mobility, wherein the specific zone is pre-divided into the plurality of sub-zones based on the movement direction.

2. The method of claim 1, wherein the first signal includes information about a location, movement speed and movement direction measured with respect to the UE.

3. The method of claim 1, further comprising:
performing a search for the beam management signal for neighboring UEs for a preset time;
wherein the first signal is transmitted together with a signal for an initial access to the base station after the search is completed.

4. The method of claim 3, wherein the first signal further includes information about the beam acquisition ID for the neighboring UEs.

5. The method of claim 1, wherein, based on the movement direction being changed by a preset threshold angle or more or based on a movement speed greater than or equal to a preset threshold speed being detected for a preset threshold time, the UE transmits a third signal for a request for an update of the first beam acquisition ID to the base station after the preset time.

6. The method of claim 5, wherein the third signal includes the first beam acquisition ID, beam acquisition IDs for neighboring UEs detected for the preset time, and beam acquisition IDs for other UEs connected by the beam management signal.

7. The method of claim 1, wherein the plurality of sub-zones is configured to be pre-divided in the specific zone based on a predetermined reference direction and a specific angle.

8. The method of claim 7, wherein the first beam acquisition ID is assigned from among remaining beam acquisition IDs excluding beam acquisition IDs for the other UEs from among a plurality of beam acquisition IDs included in a beam acquisition ID set preconfigured for the first sub-zone.

9. The method of claim 8, wherein, based on the first signal being transmitted while further including information about the beam acquisition ID for neighboring UEs searched for a preset time,
the first beam acquisition ID is assigned from among remaining beam acquisition IDs excluding the beam acquisition IDs for the other UEs and beam acquisition IDs for the neighboring UEs in the beam acquisition ID set.

10. The method of claim 7, wherein, based on a plurality of beam acquisition IDs included in a beam acquisition ID set preconfigured for the first sub-zone being all assigned, the first beam acquisition ID is assigned to overlap with any one of beam acquisition IDs assigned to the other UEs based on a time when each of the plurality of beam acquisition IDs is assigned to the other UEs.

11. The method of claim 7, wherein the predetermined reference direction is determined based on a geographical feature of the specific zone.

12. The method of claim 11, wherein the predetermined reference direction is predetermined based on a latitude and longitude of the specific zone.

13. The method of claim 1, wherein the first beam acquisition ID is independently assigned regardless of a beam acquisition ID assigned to each of the plurality of sub-zones except for the first sub-zone.

14. A method of assigning a beam management identification (ID) based on a plurality of zones included in a preconfigured area by a base station in a wireless communication system supporting a sidelink, the method comprising:
transmitting first configuration information for a resource pool related to the sidelink to a user equipment (UE);
transmitting g second configuration information for configuring a plurality of zones to the UE;
receiving, from the UE, an first signal including information on at least one of the position and mobility of the UE; and
transmitting a second signal, to the UE, including information on a first beam acquisition ID for identification of a beam management signal,
wherein the first beam acquisition ID is one of beam acquisition IDs configured for a first sub-zone related to a movement direction of the UE among a plurality of sub-zones based on the mobility,
wherein the specific zone is pre-divided into the plurality of sub-zones based on the movement direction.

15. A user equipment (UE) assigned a beam management identification (ID) based on a plurality of zones included in a preconfigured area in a wireless communication system supporting a sidelink, the UE comprising:
a radio frequency (RF) transceiver; and
a processor connected to the RF transceiver,
wherein the processor controls the RF transceiver to perform operations, the operations comprising:
receiving first configuration information for a resource pool related to the sidelink from a base station;
receiving second configuration information for configuring a plurality of zones from the base station;
measuring at least one of a position and mobility of the UE;
determining a specific zone related to the position of the UE among the plurality of zones;
transmitting, to a base station, a first signal including information on at least one of the position and mobility of the UE;
receiving a second signal, from the base station, including information on a first beam acquisition ID for identification of a beam management signal; and
transmitting the sidelink signal in the resource pool based on the first beam acquisition ID,
wherein the first beam acquisition ID is one of beam acquisition IDs configured for a first sub-zone related to a movement direction of the UE among a plurality of sub-zones based on the mobility, wherein the specific zone is pre-divided into the plurality of sub-zones based on the movement direction.

\* \* \* \* \*